(12) United States Patent
Gard

(10) Patent No.: US 6,612,812 B1
(45) Date of Patent: Sep. 2, 2003

(54) SEMIAUTOMATIC ELECTRONIC SYSTEM FOR SENSING AND INCREASING LIQUID IN A CONTAINMENT VESSEL TO A PREDETERMINE LEVEL

(76) Inventor: Wesly R. Gard, 400 Dorrance St., Bakersfield, CA (US) 93307

( * ) Notice: Subject to any disclaimer, the term of this patent is extended or adjusted under 35 U.S.C. 154(b) by 0 days.

(21) Appl. No.: 10/010,453

(22) Filed: Dec. 6, 2001

(51) Int. Cl.[7] .............................................. F04B 49/00
(52) U.S. Cl. ........................... 417/12; 417/36; 307/118
(58) Field of Search ............................ 417/12, 26, 27, 417/30, 36; 307/118

(56) References Cited

U.S. PATENT DOCUMENTS

| | | | | |
|---|---|---|---|---|
| 3,252,420 A | * | 5/1966 | Sorensen ..................... | 417/36 |
| 4,105,367 A | * | 8/1978 | Francis, Jr. .................. | 417/36 |
| 4,120,611 A | * | 10/1978 | Salve .......................... | 417/36 |
| 4,265,262 A | * | 5/1981 | Hotine ......................... | 137/2 |
| 4,613,764 A | | 9/1986 | Lobato ........................ | 307/116 |
| 4,817,217 A | * | 4/1989 | Lively .......................... | 4/508 |
| 5,803,711 A | * | 9/1998 | Schoenmeyr ................ | 417/36 |
| 6,006,605 A | * | 12/1999 | Sulollari ....................... | 73/306 |
| 6,079,950 A | | 6/2000 | Seneff .......................... | 417/12 |
| 6,109,050 A | | 8/2000 | Zakryk ....................... | 62/238.6 |

* cited by examiner

Primary Examiner—Cheryl J. Tyler
Assistant Examiner—Michael K. Gray
(74) Attorney, Agent, or Firm—Richard L. Miller

(57) ABSTRACT

A semiautomatic electronic system for sensing and accordingly raising if such is determined to be required, the fluid level of a liquid present in swimming pools, animal water drinking troughs, or any other liquid containment vessels. For the accomplishment of this task an electronic circuit periodically, in accordance with a schedule prescribe by a user, samples the environment of the space in a liquid containment vessel to determine if a liquid level has fallen below a predetermine level prescribed by the user. If such is the case, either a pump or a solenoid valve can be automatically activated, so as to cause liquid to be added to the containment vessel, only until the liquid in the containment vessel is restored to the required predetermined level.

7 Claims, 1 Drawing Sheet

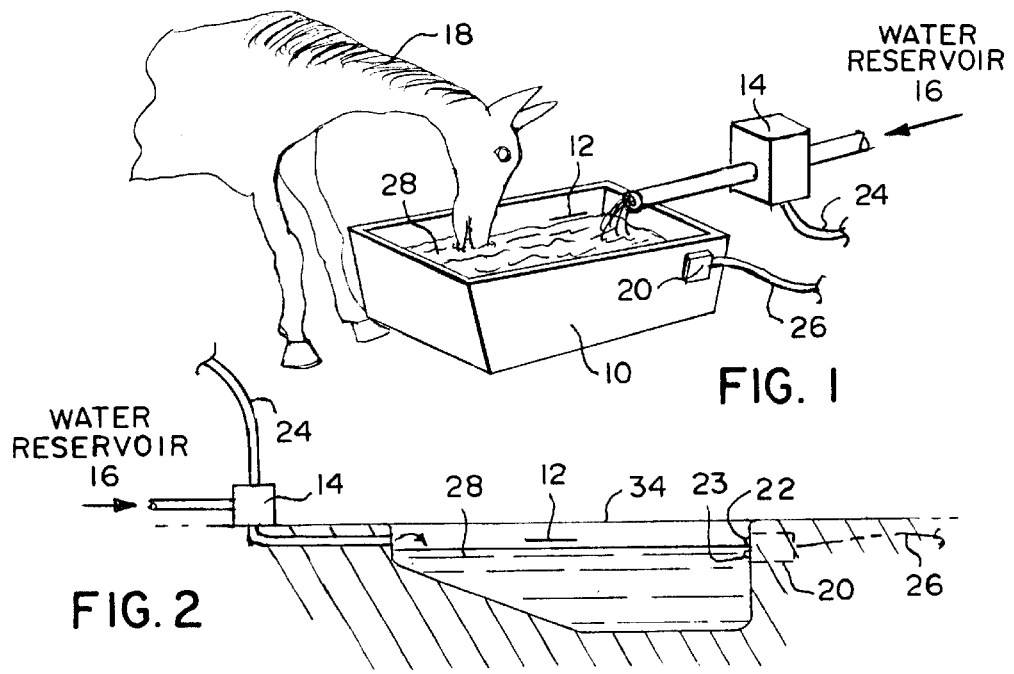
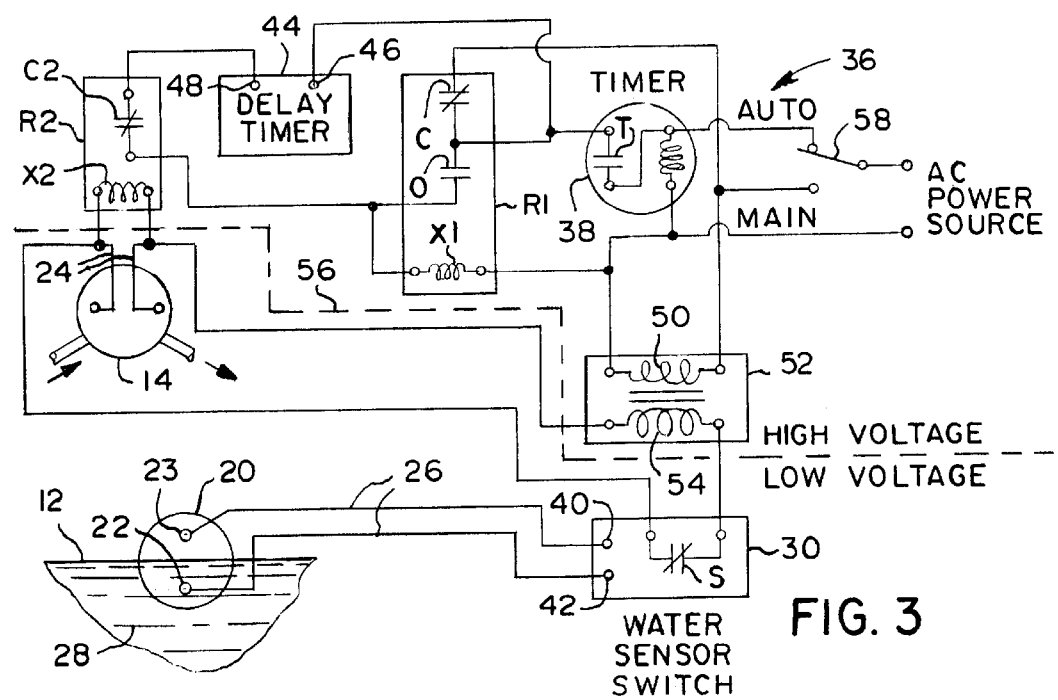

SEMIAUTOMATIC ELECTRONIC SYSTEM FOR SENSING AND INCREASING LIQUID IN A CONTAINMENT VESSEL TO A PREDETERMINE LEVEL

BACKGROUND OF THE INVENTION

1. Field of the Invention

The present invention relates to an electronic system for sensing and accordingly raising if such is determined to be required, the fluid level of a liquid present in swimming pools, animal water drinking troughs, or any other liquid containment vessels.

2. Description of the Prior Art

Numerous innovations for dealing with liquid contained in various vessels have been provided in the prior art that will be described. Even though these innovations may be suitable for the specific individual purposes to which they address, however, they differ from the present invention.

A FIRST EXAMPLE, U.S. Pat. No. 4,613,764 to Lobato teaches a rain detector is provided for preventing operation of an irrigation system upon detection of an adjustably selected amount of rainfall. The rain detector is designed for use with an automatic irrigation control system of the type including a clock controller to electrically operate one or more normally closed valves for programmed supply of irrigation water to sprinklers individually or in selected groups. The rain detector comprises a switching circuit connected electrically in series with the sprinkler valves, with the switching circuit including space sensors extending for an adjustable depth into a collection tray exposed to rainfall. The switching circuit is normally closed in the absence of rainfall to permit normal programmed operation of the sprinkler valves. However, when rainfall within the collection tray reaches a level bridging the sensors, the switching circuit is triggered to form an effective open circuit condition between the clock controller and the sprinkler valves, thereby closing the sprinkler valves pending evaporation of the rainwater to a level below the sensors.

A SECOND EXAMPLE, U.S. Pat. No. 6,079,950 to Seneff teaches a control system is disclosed for a swimming pool or a spa recirculating system. Water is withdrawn from a pool or spa by a pump and supplied, through a filter, back to the pool. As is common with such systems, a controller is operated to initiate operation of the pump at pre-established time intervals (for example, once every twenty-four hours). The length of time or duty cycle that the pump is operated at each of these time intervals is determined by a temperature sensor which senses the water temperature. The temperature sensor supplies a signal to the controller to cause the pump to be operated for a longer period of time when the water temperature is above a threshold temperature, and to be operated for a shorter period of time when the water temperature is below the predetermined threshold.

A THIRD EXAMPLE, U.S. Pat. No. 6,109,050 to Zakryk teaches to be used with a pool assembly of the type including a swimming pool, and a pool pump, a self regulating pool heater unit having a refrigeration unit structured and disposed to emit heat in order to heat a quantity of water cycled therethrough by the pool pump. Further, a power source is included and connected to the refrigeration unit, and to the pool pump through a timer. The timer has an on mode which sets a predetermined time period during which the power supplied by the power source flows therethrough to the pool pump so that it will function, and an off mode wherein no power flows through the timer to the pool pump. Additionally, an automatic timer bypass is included and connected in line between the power source and the pool pump. The automatic timer bypass is switchable between a bypass position and a normal position, the bypass position being defined by power flowing through the automatic timer bypass so as to bypass the timer, if it is not in the on mode, thereby ensuring that power flows to the pool pump regardless of the mode of the timer. Conversely, the normal position of the automatic timer bypass allows power to flow to the pump only through the timer. Further, the unit is structured to indicate when any of a number of defined hazardous operating conditions are present and prevent operation if the refrigeration unit.

SUMMARY OF THE INVENTION

AN OBJECT of the present invention is to provide a semiautomatic electronic system for sensing and accordingly raising if such is determined to be required, the fluid level of a liquid present in a containment vessel, that avoids the disadvantages of the prior art.

ANOTHER OBJECT of the present invention is to provide a semiautomatic electronic system for sensing and accordingly raising if such is determined to be required, the fluid level of a liquid present in a containment vessel, that is simple and inexpensive to manufacture.

STILL ANOTHER OBJECT of the present invention is to provide a semiautomatic electronic system for sensing and accordingly raising if such is determined to be required, the fluid level of a liquid present in a containment vessel, that is simple to use.

BRIEFLY STATED, STILL YET ANOTHER OBJECT of the present invention is to provide a semiautomatic electronic system for sensing and accordingly raising if such is determined to be required, the fluid level of a liquid present in swimming pools, animal water drinking troughs, or any other liquid containment vessels. For the accomplishment of this task an electronic circuit periodically, in accordance with a schedule prescribe by a user, samples the environment of the space in a liquid containment vessel to determine if a liquid level has fallen below a predetermine level prescribed by the user. If such is the case, either a pump or a solenoid valve can be automatically activated, so as to cause liquid to be added to the containment vessel, only until the liquid in the containment vessel is restored to the required predetermined level.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWING

The figures of the drawings are briefly described as follows:

FIG. 1 is a diagrammatic perspective view illustrating the present invention being utilized to keep a water trough at a comfortable level from which an animal can drink;

FIG. 2 is a diagrammatic cross sectional view illustrating the invention being utilized in a typical swimming pool situation; and FIG. 3 is a schematic diagram of the present invention.

A MARSHALLING OF REFERENCE NUMERALS UTILIZED IN THE DRAWING

| | |
|---|---|
| 10 | water trough |
| 12 | water level |
| 14 | pump/solenoid valve |
| 16 | water reservoir |
| 18 | animal |
| 20 | water sensor element housing |
| 22 | fluid sensing contact |
| 23 | higher contact |
| 24 | electrical cable for operating the pump/solenoid valve 14 |
| 26 | electrical cable for is provided for transmitting liquid level data information from fluid sensing elements 22 |
| 28 | water |
| 30 | water sensor switch |
| 34 | swimming pool |
| 36 | circuitry of present invention which accomplishes the task of raising the liquid level 12 of water 28 in a containment vessel |
| 38 | clock timer |
| 40 | terminal block of water sensor switch |
| 42 | terminal block of water sensor switch |
| 44 | delay timer |
| 46 | terminal of delay timer |
| 48 | terminal of delay timer |
| 50 | transformer primary winding |
| 52 | transformer |
| 54 | transformer secondary winding |
| 56 | demarcation dotted line |
| 58 | mode switch |
| | normally closed contact of first relay R1 |
| O | normally open contact of first relay R1 |
| X1 | coil of first relay R1 |
| R1 | first relay |
| C2 | normally closed contact of second relay R2 |
| X2 | coil of second relay R2 |
| S | normal closed equivalent contact of water sensor switch 30 which opens when water bridges fluid sensing contacts 22 and 23 |
| T | contact of clock timer 38 |

DETAILED DESCRIPTION OF THE PREFERRED EMBODIMENT

Referring now to the figures, in which like.numerals indicate like parts, and particularly to FIGS. 1 and 3, there illustrates a first example utilizing the present invention, which is a water trough 10 having water 28 maintained at a water level 12, which is replenished by a pump/solenoid valve 14, which is in fluid communication with a water reservoir 16, so that an animal 18 may comfortably drink therefrom at will. A water sensor element housing 20 is fixedly mounted on the trough 10 and has two fluid sensing contacts 22 and 23, partially contained therein, in fluid communication with the water 28 in the trough 10. Electrical cable 24 for operating the pump/solenoid valve 14 is provided for supplying a low voltage source of power to the pump/solenoid valve 14. Electrical cable 26 is provided for transmitting liquid level data information from fluid sensing contacts 22 and 23 to an input of a water sensor switch 30.

Referring now again to the figures, in which like numerals indicate like parts, and particularly to FIGS. 2 and 3, there illustrates a second example utilizing the present invention, which is a swimming pool 34 having water 28 maintained at a level 12, which is replenished by a pump/solenoid valve 14 which is in fluid communication with a water reservoir 16, so that people may comfortably swim therein at will. A water sensor element housing 20 is fixedly mounted in the pool at the desired water level 12 has two fluid sensing contacts 22 and 23, partially contained therein, in fluid communication with the water 28 in the swimming pool 34. Electrical cable 24 for operating the pump/solenoid valve 14 is provided for supplying a low voltage source of power to the pump/ solenoid valve 14. Electrical cable 26 is provided for transmitting liquid level data information from fluid sensing contacts 22 and 23 to an input of water sensor switch 30.

It is to be noted that so there is no ambiguity, the component specified as the pump/solenoid valve 14, is either a pump or a solenoid valve, one or the other, whichever is appropriate in accordance with the parameters of a particular installation.

In order to better appreciate the scheme in which the circuitry 36 of the present invention which accomplishes the task of raising the liquid level 12 of water 28 in a containment vessel, it is important to realize that it is not necessary for the water level to be continuously raised every time the water level drops Just a small amount. To the contrary it is an object of the present invention not to automatically perform or operate in such a manner. If the circuit attempted to adjust the level, every time the level dropped just a slight amount, the circuit would cycle every time an animal took a drink, every time a bather got in and out of the swimming pool, every time a wind blew ripples across the swimming pool, every time a bird took bath, in short every little disturbance would cause needless undesirable cycling of the pump/solenoid valve 14 and all the rest of the associated circuitry.

Accordingly in order to prevent this undesirable cycling and recycling a clock timer 38 is employed and is programmed to a schedule prescribe by the user suitable for the situation, as may be required by the parameters dictated by the particular containment vessel such as a water trough 10 or swimming pool 34 and the intended use.

Another point to be understood about the circuitry 36 is the nature of the water sensor switch 30. The water sensor switch 30 has two terminal blocks 40 and 42 connected to a pair of electrical contacts 22, and 23, which may be disposed in a vertical orientation one above the other with the higher contact 23 at the desired water level. The nature of the water sensor switch 30 is such that its output is closed, i.e. it conducts AC current when the water level 12 is below the higher contact 23, and does not bridge the space between electrical contacts 22, and 23. Conversely, the switch output is open i.e. it does not conducts AC current when the water level 12 is sufficiently high enough so as to come in contact with both contacts 22 and 23 simultaneously. Circuitry of this type is well known and an example of such which would be suitable for use in the present invention may be seen in FIG. 9 of U.S Pat. No. 4,613,764 to Lobato.

A second point to be understood about the circuitry 10 is the nature of the delay timer 44 which is well known in the art and has the logic that it remains an open circuit, i.e. it does not conduct any current until a voltage has been presented across its terminal, 46 and 48 for a predetermined length of time set in the delay timer 44. After such length of time has elapsed the timer 44 becomes a short circuit, i.e. it conducts current as if there is a conductor between terminals 46 and 48. For this particular circuit a delay time of approximately 5 seconds is quite suitable.

Having described the nature of the initial conditions for both the water sensor switch 30 and the delay timer 44 and keeping in mind the sampling scheme of the circuit, it will be clear as to just how the circuit accomplishes the required task of raising the water level periodically if it has fallen below the desired water level 12, that is, below the higher contact 23.

Examining the circuit 36 of FIG. 3 it is observed that it is shown with all components as if power has not yet been applied. At a typical sampling time, with a mode switch 58 set in the AUTO position the following set of asynchronous steps will occur.

1. Clock timer 38 output closes contact "T" and a current path is completed through contact "C", of first relay R1 and transformer primary winding 50 back to AC power source.
2. Assuming water level is low, i.e below contact 23, then equivalent contact "S", of water sensor switch 30 is closed and accordingly pump/solenoid valve 14 and coil X2 of second relay R2 are activated simultaneously, and the containment vessel 10, 34 begins to have is water level 12 raised.
3. Pump/solenoid valve 14 and coil X2 of second relay R2 remain activated until:
   a) Water sensor switch 30 opens equivalent contact "S", because the water level has reached contact 23 of the water sensor switch 30, or
   b) Clock timer 38 output opens contact "T".
4. If the sequence of events is such that the water sensor 30 opens equivalent contact "S", of step 3a occurs first before step 3b, then pump/solenoid valve 14 and coil X2 of second relay R2 are accordingly deactivated and simultaneously second relay R2 has contact C2 closed, and the water level of water containment vessel stops rising. Accordingly a few seconds later (five) delay timer 44 activates, which completes a current path through coil X1 of first relay R1 which closes contact "0", of first relay R1, and seals first relay R1 on through contact "T" of clock timer 38.
5. Accordingly contact "C", of first relay R1, is sealed open so that minor disturbances of the water level 12 do not cause the system to cycle once its water sensor has signaled that the required fill level has been achieved.
6. When the clock timer 35 contact "T" opens all power is removed from all components and the system is reset to its initial conditions, as shown in FIG. 3, and is ready to operate again. However, this will not occur until the clock timer 38 again closes contact "T" and begins the cycle again. If the water level is not low nothing will happen because equivalent contact "S" of water switch 30 will be open.
7. If the sequence of events is such that the clock timer 38 opens contact "T", of step 3b occurs first before step 3a, then all power is removed from all components, the water stops rising, the system is reset to its initial conditions and is also ready to operate again.

It should be noted that the delay timer 46 is required because if it were not connected in series with contacts C2, of second relay R2, and coil X1, of first relay R1, then, coil X1, of first relay R1, would be involved in a race with the coil X2, of second relay R2, resulting in random and unreliable results. Having the delay timer 44 present, accordingly insures that coil X1, of first relay R1, is only activated in response to coil X2, of second relay R2, being deactivated in response to the desired water level 12 having been achieved.

Examining the circuit 36 of FIG. 3 it is observed that it is shown with all components as if power has not yet been applied. At a typical sampling time, with a mode switch 58 set in the MAN position the following will occur. The timer 38 is bypassed and power is directly applied to the transformer primary winding 50 of transformer 52. Accordingly the pump/solenoid valve 14 will be activated and will remain continuously activated until the water level 12 reaches contact 23 of the water sensor switch 30. At this time the circuit 36 will become sensitive to every small disturbance as previously described as undesirable. This mode is useful if for some reason it is necessary to replenish a large quantity of water without having to change the normal schedule prescribe by the user suitable for the situation, as may be required by the parameters dictated by the particular containment vessel 10.

There is one other feature of the circuit 36 which is particularly noteworthy. Attention is drawn to the fact that all the components isolated below the demarcation dotted line 56 may be operated at a lower voltage such as 24 volt, 12 volts or even 6 volts, while all the components isolated above the demarcation dotted line 56 may be operated at a higher voltage such as 120 volts, or even 240 volts.

This is particularly important because the components that are operated at the lower voltage, produced by the transformer secondary winding 54, are in the group that can easily come in contact with animals or people and naturally if operated at a low voltage present a relatively lower risk for shock hazard or electrocution. At the same time however the circuit can have a normal value of residential voltage such as 120-AC or 240-AC which is typically that which comes out of most wall sockets present as a power source.

It will be understood that each of the elements described above, or two or more together, may also find a useful application in other types of constructions differing from the types described above.

While the invention has been illustrated and described as a semiautomatic electronic system for sensing and raising liquid level in a containment vessel to a predetermine level, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A semi-automatic electronic system for sensing and increasing a water level in a containment vessel to a predetermined level, said system comprising:
   a) a mode switch having an electrical terminal for electrically communicating with an AC power source, an AUTO electrical terminal, and a MAIN electrical terminal;
   b) a clock timer having a coil with a first electrical terminal and a second electrical terminal, and contacts with a first electrical terminal and a second electrical terminal; said first electrical terminal of said coil of said clock timer being in direct electrical communication with said AUTO electrical terminal of said mode switch and with said second electrical terminal of said contacts of said clock timer; said second electrical terminal of said coil of said clock timer for being in direct electrical communication with the AC power source;
   c) a first relay having normally closed contacts with a first electrical terminal and a second electrical terminal, normally open contacts with a first electrical terminal and a second electrical terminal, and a coil with a first electrical terminal and a second electrical terminal; said first electrical terminal of said normally closed contacts of said first relay being in direct electrical communication with said MAIN electrical terminal of said mode switch; said second electrical terminal of said normally closed contacts of said first relay being in direct electrical communication with said first electrical terminal of said normally open contacts of said first relay; said first electrical terminal of said contacts of said clock timer being in direct electrical communication with said second electrical terminal of said normally closed contacts of said first relay and with said first electrical terminal of said normally open contacts of said first relay; said second electrical terminal of said coil of said first relay being in direct electrical communication with said second electrical terminal of said coil of said clock time and for being in direct electrical communication with the AC power source; said first electrical terminal of said coil of said first relay being in direct electrical communication with said second electrical terminal of said normally open contacts of said first relay;

d) a delay timer having a first electrical terminal and a second electrical terminal; said second electrical terminal of said delay timer being in direct electrical communication with said second electrical terminal of said normally closed contacts of said first relay, with said first electrical terminal of said normally open contacts of said first relay, and with said first electrical terminal of said contacts of said clock timer;

e) a second relay having contacts with a first electrical terminal and a second electrical terminal, and a coil with a first electrical terminal and a second electrical terminal; said first electrical terminal of said contacts of said second relay being in direct electrical communication with said first electrical terminal of said delay timer; said second electrical terminal of said contacts of said second relay being in direct electrical communication with said second electrical terminal of said normally open contacts of said first relay and with said first electrical terminal of said coil of said first relay;

f) a transformer having a primary winding with a first electrical terminal and a second electrical terminal, and a secondary winding having a first electrical terminal and a second electrical terminal; said first electrical terminal of said primary winding of said transformer being in direct electrical communication with said second electrical terminal of said coil of said first relay and with said second electrical terminal of said coil of said clock timer; said first electrical terminal of said primary winding of said transformer for being in direct electrical communication with the AC power source; said second electrical terminal of said primary winding of said transformer being in direct electrical communication with said MAIN electrical terminal of said mode switch;

g) one of a pump and a solenoid valve having a first electrical terminal and a second electrical terminal; said first electrical terminal of said one of a pump and a solenoid valve being in direct electrical communication with said first electrical terminal of said coil of said second relay; said second electrical terminal of said one of a pump and a solenoid valve being in electrical communication with said second electrical terminal of said coil of said second relay; said second electrical terminal of said one of a pump and a solenoid valve being in direct electrical communication with said first electrical terminal of said secondary winding of said transformer;

h) a water sensor switch having normally closed contacts with a first electrical terminal and a electrical second terminal, and a first electrical terminal and a second electrical terminal; said first electrical terminal of said normally closed contacts of said water sensor switch being in direct electrical communication with said first electrical terminal of said one of a pump and a solenoid valve and with said first electrical terminal of said coil of said second relay; said second electrical terminal of said normally closed contacts of said water sensor switch being in direct electrical communication with said second electrical terminal of said secondary winding of said transformer; and i) a water sensor element housing for positioning in the containment vessel and having a pair of electrical contacts; one of said pair of electrical contacts of said water sensor element housing being in direct electrical communication with said first electrical terminal of said water sensor switch and the other of said pair of electrical contacts of said water sensor element housing being in direct electrical communication with said second electrical terminal of said water sensor switch.

2. The semi-automatic electronic system as defined in claimed 1, wherein:

a) said clock timer prevents undesirable cycling and recycling of said semi-automatic electronic system;

b) said water sensor switch, senses the water level in the containment vessel; and c) said semi-automatic electronic system is responsive simultaneously to an output of said clock timer and an output of said water sensor switch.

3. The semi-automatic electronic system as defined in claim 1, wherein said clock timer is programmable to a schedule prescribed by a user.

4. The semi-automatic electronic system as defined in claim 1, wherein said water sensor switch conducts an AC current when the water level does not bridge a space between said pair of electrical contacts associated with said water sensor switch.

5. The semi-automatic electronic system as defined in claim 1, wherein said first relay is held activated through a conductive path of said output of said clock timer which accordingly opens said normally closed contacts of said first relay which disconnects power from said transformer and simultaneously causes said semi-automatic system to be non-responsive to a disturbance in the water level.

6. The semi-automatic electronic system as defined in claim 5, wherein said mode switch allows said clock timer to be disenabled without altering a programmed schedule prescribed by a user.

7. The semi-automatic electronic system as defined in claim 5, wherein a portion of said semi-automatic electronic system that is easily contactable by animals and people is electrically isolated and operated at a low voltage.

* * * * *